US008751214B2

(12) United States Patent
Kato

(10) Patent No.: US 8,751,214 B2
(45) Date of Patent: Jun. 10, 2014

(54) INFORMATION PROCESSOR FOR TRANSLATING IN ACCORDANCE WITH FEATURES OF AN ORIGINAL SENTENCE AND FEATURES OF A TRANSLATED SENTENCE, INFORMATION PROCESSING METHOD, AND COMPUTER READABLE MEDIUM

(75) Inventor: Masahiro Kato, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1220 days.

(21) Appl. No.: 12/211,543

(22) Filed: Sep. 16, 2008

(65) Prior Publication Data
US 2009/0234637 A1 Sep. 17, 2009

(30) Foreign Application Priority Data

Mar. 14, 2008 (JP) ................. 2008-065504

(51) Int. Cl.
*G06F 17/28* (2006.01)

(52) U.S. Cl.
USPC ........ 704/3; 704/2; 704/9; 715/203; 345/467; 345/636; 382/190; 382/187; 382/185; 382/178

(58) Field of Classification Search
USPC ........ 704/2–3, 10, 9, 260; 382/190, 187, 185, 382/178, 181; 345/467, 636; 715/243
See application file for complete search history.

(56) References Cited

U.S. PATENT DOCUMENTS

| | | | | |
|---|---|---|---|---|
| 5,063,508 A | * | 11/1991 | Yamada et al. | 704/3 |
| 5,175,684 A | * | 12/1992 | Chong | 704/3 |
| 5,517,409 A | | 5/1996 | Ozawa et al. | |
| 5,845,143 A | * | 12/1998 | Yamauchi et al. | 704/2 |
| 5,956,669 A | * | 9/1999 | Ozawa | 704/5 |
| 5,978,754 A | * | 11/1999 | Kumano | 704/3 |
| 6,381,368 B1 | * | 4/2002 | Kanatsu | 382/233 |
| 7,570,842 B2 | * | 8/2009 | Suenaga et al. | 382/321 |
| 7,729,540 B2 | * | 6/2010 | Koyama et al. | 382/181 |
| 7,783,472 B2 | * | 8/2010 | Nagao et al. | 704/2 |
| 7,865,353 B2 | * | 1/2011 | Koyama et al. | 704/3 |
| 8,045,808 B2 | * | 10/2011 | Oliver | 382/229 |
| 2004/0260535 A1 | * | 12/2004 | Chen et al. | 704/9 |

(Continued)

FOREIGN PATENT DOCUMENTS

| | | |
|---|---|---|
| JP | A-5-324720 | 12/1993 |
| JP | A-8-6948 | 1/1996 |

(Continued)

OTHER PUBLICATIONS

Australian Office Action issued on Dec. 4, 2009 in corresponding Japanese Patent Application No. 2008-221525.

(Continued)

*Primary Examiner* — Vijay B Chawan
(74) *Attorney, Agent, or Firm* — Oliff PLC

(57) ABSTRACT

An information processor includes: a character recognizing unit; a recognized character feature obtaining unit; a translation deciding unit; a translating unit; a translated result feature obtaining unit; an output deciding unit; an image receiving unit; and an output unit that, wherein the character recognizing unit recognizes a character in character image of the image data received by the image receiving unit, and the recognized character feature obtaining unit, in a case where a picture image other than the character is recognized, obtains a third feature related to a character included in the picture image.

12 Claims, 11 Drawing Sheets

(56) References Cited

U.S. PATENT DOCUMENTS

| | | | |
|---|---|---|---|
| 2005/0226516 A1* | 10/2005 | Kimura et al. | 382/243 |
| 2005/0226517 A1* | 10/2005 | Kimura et al. | 382/243 |
| 2006/0045386 A1* | 3/2006 | Fukuoka et al. | 382/305 |
| 2006/0200335 A1* | 9/2006 | Itonori et al. | 704/2 |
| 2006/0200339 A1* | 9/2006 | Satake et al. | 704/4 |
| 2006/0204094 A1* | 9/2006 | Koyama et al. | 382/176 |
| 2006/0204111 A1* | 9/2006 | Koshi et al. | 382/229 |
| 2006/0206307 A1* | 9/2006 | Sugihara et al. | 704/4 |
| 2006/0215187 A1* | 9/2006 | Itonori et al. | 358/1.2 |
| 2006/0215909 A1* | 9/2006 | Itonori et al. | 382/176 |
| 2006/0217954 A1* | 9/2006 | Koyama et al. | 704/2 |
| 2006/0217958 A1* | 9/2006 | Tagawa et al. | 704/2 |
| 2006/0217959 A1* | 9/2006 | Saito et al. | 704/2 |
| 2006/0217961 A1* | 9/2006 | Masuichi et al. | 704/3 |
| 2008/0002893 A1* | 1/2008 | Vincent et al. | 382/229 |
| 2008/0063279 A1* | 3/2008 | Vincent et al. | 382/182 |
| 2008/0233980 A1* | 9/2008 | Englund et al. | 455/466 |
| 2008/0239330 A1* | 10/2008 | Sato | 358/1.1 |
| 2008/0253656 A1* | 10/2008 | Schwartzberg et al. | 382/181 |
| 2008/0304746 A1* | 12/2008 | Nakamura | 382/177 |
| 2009/0028435 A1* | 1/2009 | Wu et al. | 382/190 |
| 2009/0028445 A1* | 1/2009 | Wu et al. | 382/225 |
| 2009/0067756 A1* | 3/2009 | Meyer et al. | 382/310 |

FOREIGN PATENT DOCUMENTS

| | | |
|---|---|---|
| JP | A-2002-132765 | 5/2002 |
| JP | B2-3294919 | 6/2002 |
| JP | A-3636490 | 4/2005 |

OTHER PUBLICATIONS

May 31, 2012 Office Action issued in Korean Patent Application No. 10-2008-0098515 with translation.

* cited by examiner

FIG. 3

| No. | X COORDINATE | Y COORDINATE | HEIGHT | WIDTH | CHARACTER RECOGNIZED RESULT | NECESSITY OF TRANSLATION | TRANSLATED RESULT | NECESSITY OF OUTPUT |
|---|---|---|---|---|---|---|---|---|
| | | | | | | | | |
| | | | | | | | | |
| | | | | | | | | |

300 — 302 — 304 — 306 — 308 — 310 — 312 — 314 — 316 — 318

US 8,751,214 B2

INFORMATION PROCESSOR FOR TRANSLATING IN ACCORDANCE WITH FEATURES OF AN ORIGINAL SENTENCE AND FEATURES OF A TRANSLATED SENTENCE, INFORMATION PROCESSING METHOD, AND COMPUTER READABLE MEDIUM

CROSS-REFERENCE TO RELATED APPLICATIONS

This application is based on and claims priority under 35 U.S.C. 119 from Japanese Patent Application No. 2008-065504 filed Mar. 14, 2008.

BACKGROUND

1. Technical Field

The present invention relates to an information processor, an information processing method, and a computer readable medium.

2. Related Art

For instance, there is a translating device that a paper document having a sentence written by a first language (Refer it to also as the original, hereinafter. In this case, the sentence does not have a form of the sentence and indicates characters written by the first language) is scanned, an obtained image is analyzed to extract a sentence area, the characters of the sentence area are recognized, and a sentence (Refer it to also as a translated sentence, hereinafter. In this case, the sentence does not have a form of the sentence and indicates characters of a second language) obtained by translating an obtained text as a result of a recognition of the characters into the second language is laid out on a page and outputted.

SUMMARY

According to an aspect of the present invention, an information processor includes: a character recognizing unit that recognizes a character in a character image; a recognized character feature obtaining unit that obtains a first feature from the character recognized by the character recognizing unit; a translation deciding unit that decides whether or not the recognized character is to be translated in accordance with the first feature obtained by the recognized character feature obtaining unit; a translating unit that translates the recognized character in a case where it is decided that the recognized character is to be translated by the translation deciding unit; a translated result feature obtaining unit that obtains a second feature from a translated result obtained by the translating unit; an output deciding unit that decides whether or not the translated result obtained by translating unit is to be outputted in accordance with the second feature obtained by the translated result feature obtaining unit; an image receiving unit that receives an image data; and an output unit that, in a case where the output deciding unit decides that the translated result is to be outputted, outputs the translated result in accordance with a structure of the image data received by the image receiving unit, wherein the character recognizing unit recognizes a character in the character image of the image data received by the image receiving unit, and the recognized character feature obtaining unit, in a case where a picture image other than the character is recognized, obtains a third feature related to a character included in the picture image.

BRIEF DESCRIPTION OF THE DRAWINGS

Exemplary embodiment of the present invention will be described in detail based on the following figures, wherein:

FIG. 3 is an explanatory view showing a data structural example of a process table;

DETAILED DESCRIPTION

Figure 1:
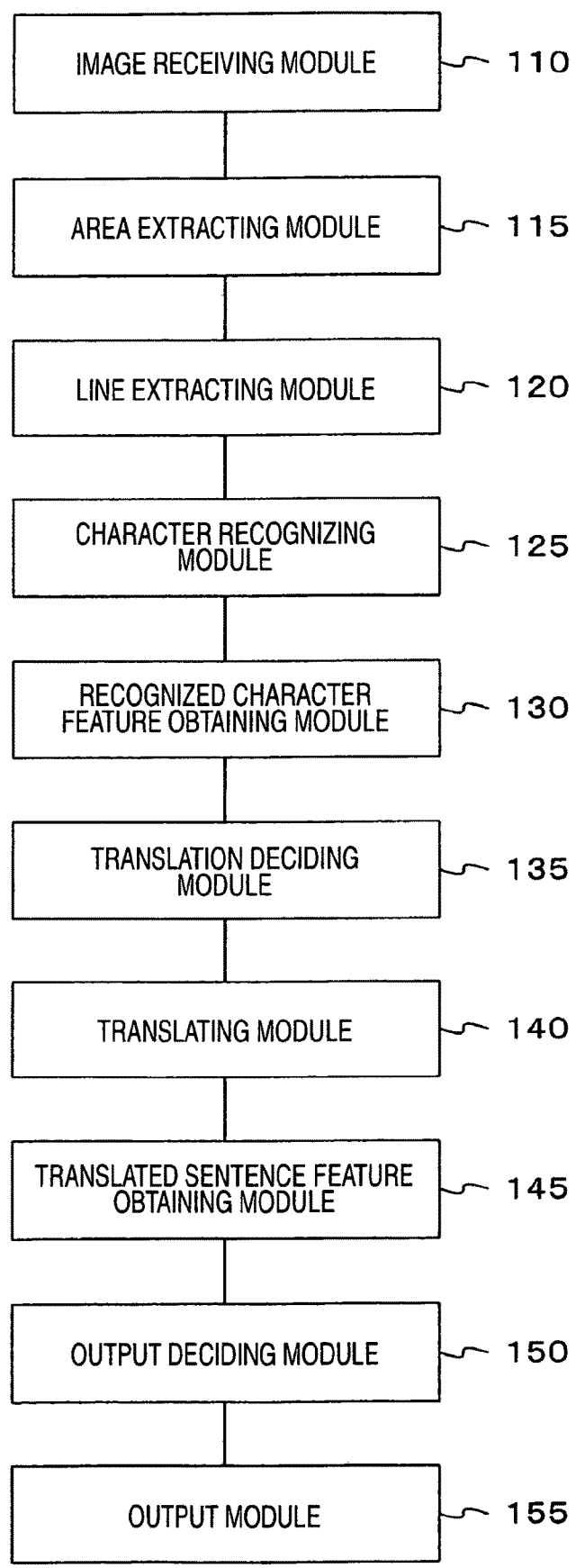
FIG. 1 is a conceptual module block diagram of a structural example of an embodiment.

Now, referring to the drawings, one preferred embodiment for realizing the present invention will be described below.

FIG. 1 shows a conceptual module block diagram of a structural example of this embodiment.

A module ordinarily indicates logically separable parts of software (computer program), hardware or the like. Accordingly, the module in this embodiment indicates not only the module in the computer program, but also the module in a hardware structure. Therefore, this embodiment also explains the computer program, a system and a method. In this case, for the convenience of explanation, "store", "allow to store" and words equivalent to them are used. When this embodiment is the computer program, these words indicate a meaning to allow a storage device to store or to control the storage device to store. Further, the module substantially corresponds to a function on a one-to-one basis. However, in a mounting, one module may be formed with one program, or a plurality of modules may be formed with one program. On the contrary, the one module may be formed with a plurality of programs. Further, the plurality of modules may be executed by one computer or one module may be executed by a plurality of computers in a distributed or parallel environment. Other modules may be included in the one module. A "connection" includes a logical connection (a transmission and reception of data, an instruction, a reference relation between data or the like) as well as a physical connection, hereinafter.

Further, a system or a device includes not only a structure obtained by connecting a plurality of computers, hardware, devices etc. by a communication unit such as a network (including a communication connection on a one to-one basis) but also a structure realized by one computer, hardware, a device or the like. The "device" and the "system" are used as words having the same meaning.

As shown in FIG. 1, this embodiment includes an image receiving module 110, an area extracting module 115, a line extracting module 120, a character recognizing module 125, a recognized character feature obtaining module 130, a translation deciding module 135, a translating module 140, a translated sentence feature obtaining module 145, an output deciding module 150 and an output module 155.

The image receiving module 110 is connected to the area extracting module 115 to receive an image and deliver the image to the area extracting module 115. To receive the image includes to read the image by a scanner, to receive the image by a facsimile device and to read the image from an image data base. The image includes a binary image and a multi-valued image such as a color image. The image may be composed of one sheet or a plurality of sheets. The contents of the image may show a document used for a business or a pamphlet for an advertisement and publicity.

The area extracting module 115 is connected to the image receiving module 110 and the line extracting module 120 to receive the image from the image receiving module 110, converts the image into the binary image when the image is the multi-valued image, extracts a character image area from the image and delivers the character image area to the line extracting module 120. That is, the image is divided into the character image area and an image area except the character image area. The character image area may be extracted by using an existing method. For instance, the character image area may be extracted on the basis of a complication, a pixel value the number of black pixels or the like per unit area. When the character image area is delivered to the line extracting module 120, the image itself of the extracted character image area may be delivered, or the image received from the image receiving module 110 and the coordinate of the character image area (for instance, when the character image area is rectangular, an x coordinate of a left and upper corner, a y coordinate, a width, a height).

The line extracting module 120 is connected to the area extracting module 115 and the character recognizing module 125 to receive the character image area from the area extracting module 115, extracts a character line therefrom and delivers the character line to the character recognizing module 125. That is, the line extracting module 120 extracts a character area for each line so as to be processed by the character recognizing module 125. Here, the character line includes a character line written in a transverse direction and a character line written in a longitudinal direction. The character line may be extracted by an existing method. For instance, a projection may be taken in a longitudinal direction or a transverse direction relative to the character image area to take out a boundary between the character lines from the histogram of the number of black pixels thereof.

The character recognizing module 125 is connected to the line extracting module 120 and the recognized character feature obtaining module 130 to receive a character image cut out for each line from the line extracting module 120, recognizes the character of the character image and delivers a recognized character as a result of recognizing the character to the recognized character feature obtaining module 130. The recognition of the character means to convert the image to a character code (a text) and an existing method may be used. Further, the size of the character may be recognized as well as the character code. In this case, as the recognized character, the size of the character is included. The character recognizing module 125 may occasionally have an error by the area extracting module 115 or the line extracting module 120, that is, the image area that is not originally the character image area as an object for recognizing the character.

Examples of processes of the image receiving module 110 to the character recognizing module 125 will be described below by referring to FIGS. 8 to 10.

The recognized character feature obtaining module 130 is connected to the character recognizing module 125 and the translation deciding module 135. The recognized character feature obtaining module 130 obtains the feature of the recognized character as the result of the recognition by the character recognizing module 125 and delivers the feature of the recognized character to the translation deciding module 135. Here, the feature of the recognized character means the feature of the recognized character mainly as the text. In this case, the feature of the recognized character may include the size of the recognized character.

For instance, a feature related to the inclusion of the recognized character may be obtained when the image except the character is recognized.

Further, for instance, a feature related to the arrangement of the recognized character may be obtained when the image except the character is recognized.

Further, a feature for the prescribed number of letters of the recognized character may be obtained.

The translation deciding module 135 is connected to the recognized character feature obtaining module 130 and the translating module 140.

The translation deciding module 135 decides whether or not the recognized character is to be translated in accordance with the feature obtained by the recognized character feature obtaining module 130 and delivers a result to the translating module 140.

Figure 5:
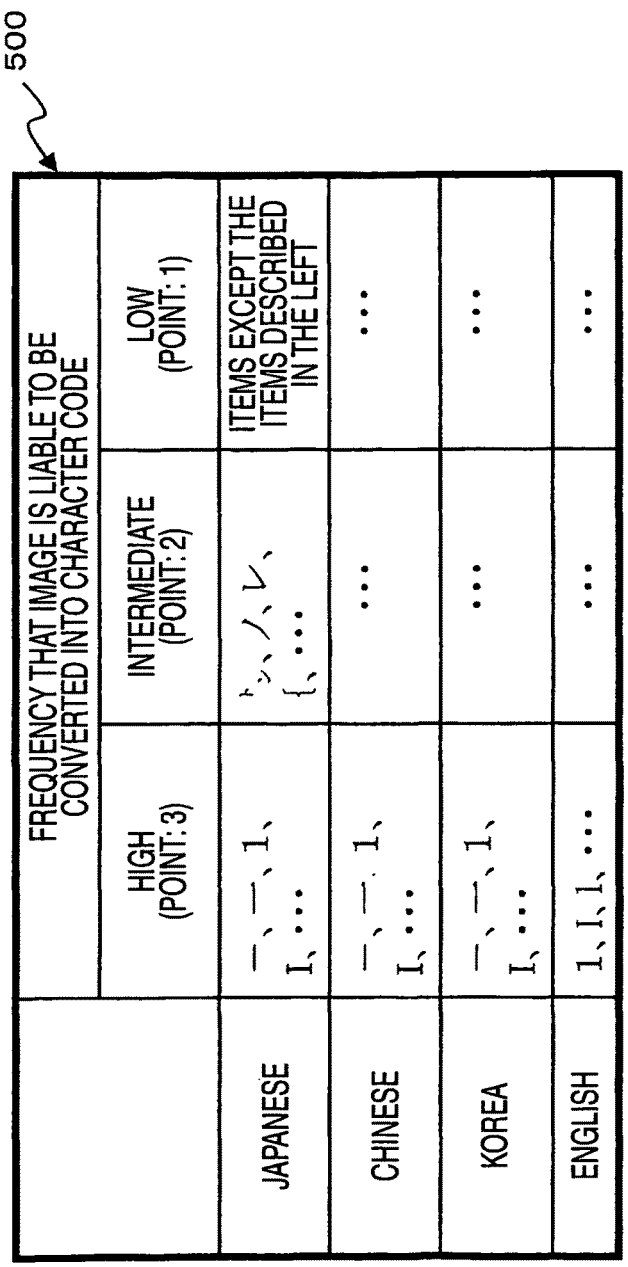
FIG. 5 is an explanatory view showing an example of a point setting table.
Figure 6:
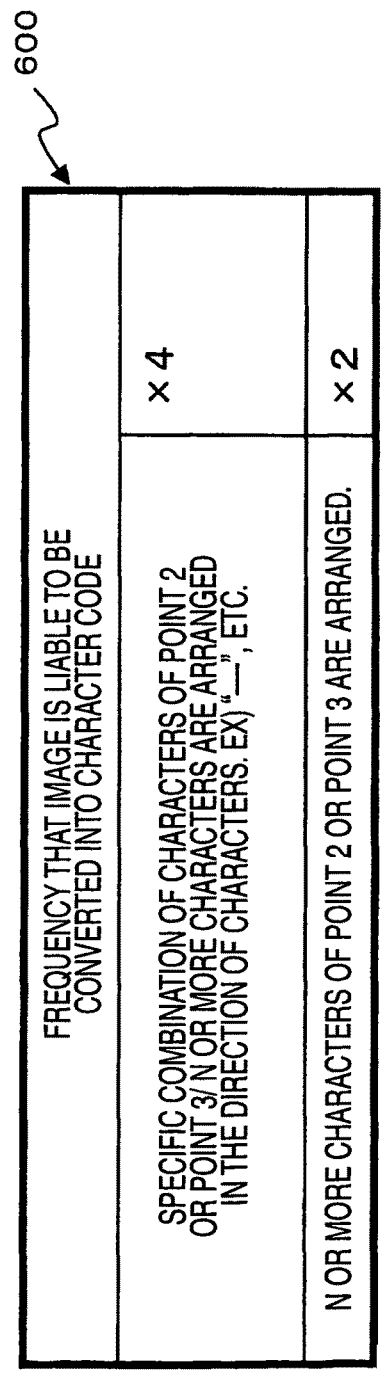
FIG. 6 is an explanatory view showing an example of a weight setting table.

Examples of processes of the recognized character feature obtaining module 130 and the translation deciding module 135 will be described below by referring to FIGS. 4 to 6.

The translating module 140 is connected to the translation deciding module 135 and the translated sentence feature obtaining module 145.

When the translation deciding module 135 decides that the recognized character is to be translated, the translating module 140 translates the recognized character that is recognized by the character recognizing module 125 and decided to be translated and delivers a translated sentence to the translated sentence feature obtaining module 145. A translation means to convert a first language into another second language having a meaning corresponding thereto and an existing method may be used.

The translated sentence feature obtaining module 145 is connected to the translating module 140 and the output deciding module 150.

The translated sentence feature obtaining module 145 obtains the feature of a translated result as a result of a translation by the translating module 140 and delivers the feature of the translated result to the output deciding module 150.

The translated sentence feature obtaining module 145 may obtain information related to the inclusion of words in the language in a translated sentence. Specifically, a dictionary (a dictionary used by the character recognizing module 125 or the translating module 140 may be made use of) that stores the words in the language is prepared to obtain how many words stored in the dictionary are included in the translated sentence. For instance, the output deciding module 150 may compare the number of the words included in the translated sentence with a prescribed threshold value, and may decide that an output of the translated sentence is necessary when the number of the words included in the translated sentence is larger.

Further, the translated sentence feature obtaining module 145 may obtain a rate of characters forming the word that are included in a character line of the translated sentence as an object. For instance, when the rate of the number of characters forming the word in the language to the number of characters of one line is higher than a prescribed threshold value, the output deciding module 150 may decide that the output of the translated sentence is necessary.

Further, the translated sentence feature obtaining module 145 may analyze the syntax of the translated sentence to obtain a result of analyzing the syntax. For instance, when the result of analyzing the syntax is proper, the output deciding module 150 may decide that the output of the translated sentence is necessary.

Further, the translated sentence feature obtaining module 145 may extract a plurality of features of the above-described translated sentence.

The output deciding module 150 is connected to the translated sentence feature obtaining module 145 and the output module 155.

The output deciding module 150 decides whether or not the translated sentence is to be outputted in accordance with feature obtained by the translated sentence feature obtaining module 145 and delivers a result thereof to the output module 155.

Further, when the translated sentence obtaining module 145 extracts the plurality of features of the above-described translated sentence, the output deciding module 150 may combine the plurality of features together and decide whether or not the translated sentence is to be outputted. In that case, the features may be weighted.

The output module 155 is connected to the output deciding module 150. When the output deciding module 150 decides that the translated sentence is to be outputted, the output module 155 outputs the translated sentence as the translated result by the translating module 140 and decided to be outputted by the output deciding module 150 on the basis of the structure of the image received by the image receiving module 110.

An example of a process of the output module 155 will be described below by referring to FIG. 7.

Figure 2:
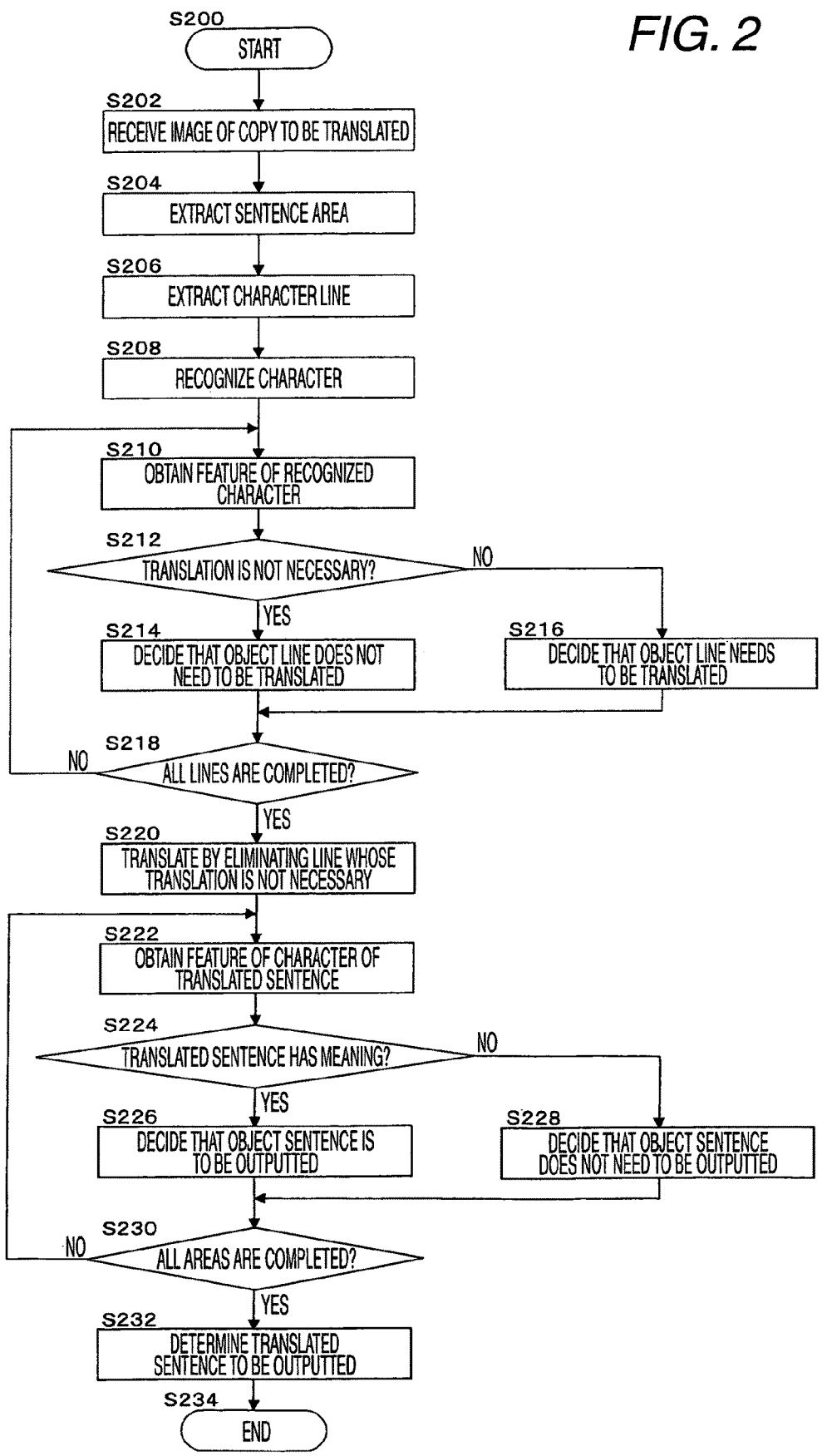
FIG. 2 is a flowchart showing a process example according to the embodiment.

FIG. 2 is a flowchart showing an example of processes by this embodiment. When the flowchart shown in FIG. 2 is explained, an explanation is given to how the columns of a process table 300 shown in FIG. 3 are respectively completed. The process table 300 includes a No. column 302, an x coordinate column 304, a y coordinate column 306, a height column 308, a width column 310, a character recognized result column 312, a column 314 showing whether or not a translation is necessary, a translated result column 316 and a column 318 showing whether or not an output is necessary.

In step S202, the image receiving module 110 receives the image as an object to be translated.

In step S204, the area extracting module 115 extracts the character image area from the image received in the step S202.

In step S206, the line extracting module 120 extracts the character lines from the character image area extracted in the step S204. Here, the line extracting module 120 allows the process table 300 to store the extracted character lines in order in the No. column 302, x coordinates at the left and upper parts of the character lines in the x coordinate column 304, y coordinates in the y coordinate column 306, the heights of the character lines in the height column 308, the widths of the character lines in the width column 310, respectively.

In step S208, the character recognizing module 125 carries out a character recognizing process to the character lines extracted in the step S206. Then, the character recognizing module 125 allows the recognized characters to be stored in the character recognized result column 312 in the process table 300.

In step S210, the recognized character feature obtaining module 130 obtains the features of the recognized characters in the step S208. That is, the recognized character feature obtaining module 130 extracts the features of the characters in the character recognized result column 312 respectively for the character lines.

In step S212, the translation deciding module 135 decides whether or not the recognized character is to be translated in accordance with the feature obtained in the step S210. When the translation deciding module 135 decides that the character line does not need to be translated (Y), the process advances to step S214, otherwise (N), the process advances to step S216. Then, in the step S214, the translation deciding module 135 allows "N" to be stored in the corresponding column 314 showing whether or not a translation is necessary. In the step S216, the translation deciding module 135 allows "Y" to be stored in the corresponding column 314 showing whether or not a translation is necessary. Examples of processes of the step S210 to the step S216 will be described below by using FIGS. 4 to 6.

In step S218, it is decided whether or not a deciding process of the step S212 is completed for all the character lines extracted in the step S206. When the deciding process is not completed (N), the process returns to the step S210. When the deciding process is completed (Y), the process advances to step S220.

In the step S220, the translating module 140 eliminates the character lines designated by "N" in the column 314 showing whether or not a translation is necessary (namely, the character lines designated by "Y" in the column 314 showing whether or not a translation is necessary are taken out) and translates character strings in the character recognized result column 312. Then, the translating module 140 stores the translated results in the corresponding translated result column 316.

In step S222, the translated sentence feature obtaining module 145 obtains the features of the translated sentences in the step S220. That is, the translated sentence feature obtaining module 145 extracts the features of the characters in the translated result column 316 respectively for the character lines.

In step S224, the output deciding module 150 decides whether or not the translated sentence has a meaning, that is, whether or not the translated sentence is to be outputted in accordance with the feature obtained in the step S222. When the output deciding module 150 decides that the character line has the meaning (Y), the process advances to step S226, otherwise (N), the process advances to step S228. Then, the output deciding module 150 allows "Y" to be stored in the corresponding column 318 showing whether or not an output is necessary. In the step S228, the output deciding module 150 allows "N" to be stored in the corresponding column 318 showing whether or not an output is necessary.

In step S230, it is decided whether or not a deciding process of the step S224 is completed for all the character lines extracted in the step S206. When the deciding process is not completed (N), the process returns to the step S222. When the deciding process is completed (Y), the process advances to step S232.

In step S232, the translated sentence to be outputted by the output module 155 is determined and the output module 155 outputs the translated sentence in accordance with the structure of the image received in the step S202.

Figure 4:
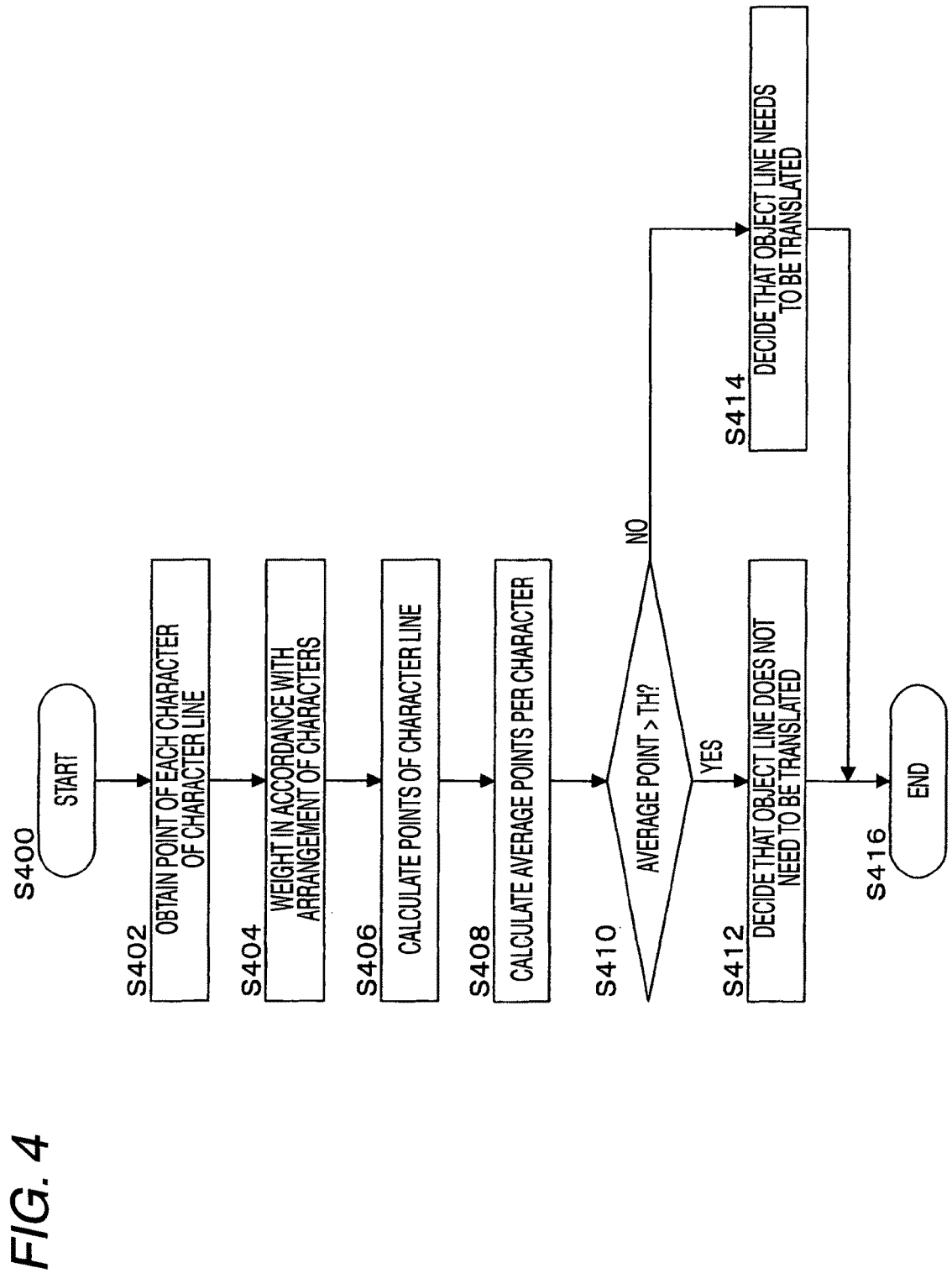
FIG. 4 is a flowchart showing a process example by a recognized character feature obtaining module and a translation deciding module.

FIG. 4 is a flowchart showing the example of the processes (the specific process examples of the step S210 to the step S216) by the recognized character feature obtaining module 130 and the translation deciding module 135. Here, whether or not the recognized character is to be translated is decided by the number of points per character. Then, when the number of points is high in the recognized character, it is decided that the recognized character is not to be translated. That is, the points reflect a possibility that an image, which is not located in the character image area, is recognized as the character.

In step S402, the number of points of each recognized character in each character line is obtained. Here, the recognized character is obtained by referring to the character recognized result column 312 and the number of points of the character is obtained by referring to a point setting table 500.

By referring to FIG. 5, an example of the point setting table 500 will be described. In the point setting table 500, the point is divided into three stages (point: 3, point: 2, point: 1). Namely, when the image that is not located in the character image area is recognized as the character, "-", "-", "1", "l", etc. that are frequently outputted as the recognized characters are set to the 3 points. "{", etc. that include a character of "ton" within one character area are set to the two points and other characters than them are set to the one point. That is, the point setting table 500 stores the number of points and the characters so as to correspond to each other. The characters axe stored respectively for languages (for instance, for Japanese, for Chinese, for Korean, for English, etc.) in the recognizing process.

It is decided that to what number of points in the point setting table 500, the characters in the character recognized result column 312 respectively correspond to obtain the points of the characters respectively.

In step S404, a weight is attached to the point depending on the arrangement of the characters (a character string) to which the points are attached in the step S402. The weight is attached by using a weight setting table 600.

By referring to FIG. 6, an example of the weight setting table 600 will be described below. The weight setting table 600 stores a rule showing a coefficient of weight and a state to which the coefficient is applied so as to correspond to each other. For instance, in the case of a state of "a combination (n or more characters are arranged in the direction of the character line) of specific characters of the point: 2 or the point: 3" (as a specific example, "- -", etc.), the number of points of the character is multiplied by 4. Further, in the case of a state that "n or more of the characters of the point: 2 or the point: 3 are arranged", the number of points of the character is multiplied by 2.

The coefficient of weight is determined depending on whether or not the arrangement of the characters in the character recognized result column 312 corresponds to the rule in the weight setting table 600.

In step S406, the number of points of each character line is calculated on the basis of the number of points obtained in the step S402 and the coefficient of weight determined in the step S404.

In step S408, in order to prevent the number of points from depending on the number of characters in the line, the number of characters in the character recognized result column 312 is counted and the number of points calculated in the step S406 is divided by the number of characters to calculate an average number of points per character.

In step S410, it is decided whether or not the average number of points calculated in the step S408 is larger than a prescribed threshold value (TH). When it is decided that the average number of points is larger than the threshold value (Y), the process advances to step S412. When it is decided that the average number of points is not larger than the threshold value (N), the process advances to step S414. In the step S412, it is decided that an object line does not need to be translated (that is, the recognized character of the character line has a high possibility that the image which is not located in the character image area is recognized as the character to allow the corresponding column 314 showing whether or not a translation is necessary to store "N". In the step S414, it is decided that the object line needs to be translated (that is, the recognized character of the character line has a high possibility that the image located in the character image area is recognized as the character) to allow the corresponding column 314 showing whether or not a translation is necessary to store "Y".

The step S402 to the step S408 are carried out by the recognized character feature obtaining module 130. The step S410 to the step S414 are carried out by the translation deciding module 135, which correspond to the step S212 to the step S216 in the flowchart shown in FIG. 2.

The recognized character feature obtaining module 130 may obtain information related to the inclusion of words in the language in the recognized character. Specifically, a dictionary (a dictionary used by the character recognizing module 125 or the translating module 140 may be made use of) that stores the words in the language is prepared to obtain how many words stored in the dictionary are included in the recognized character. For instance, the translation deciding module 135 may compare the number of the words included in the recognized character with a prescribed threshold value, and may decide that the translation is necessary when the number of the words included in the recognized character is larger.

Further, the recognized character feature obtaining module 130 may obtain a rate of the characters forming the words included in the character line as an object. For instance, when the rate of the number of characters forming the words in the language to the number of characters of one line is higher than a prescribed threshold value, the translation deciding module 135 may decide that the translation is necessary.

Further, the recognized character feature obtaining module 130 may obtain the sizes of the recognized characters respectively outputted by the character recognizing module 125. For instance, the translation deciding module 135 may decide that the translation is necessary on the basis of a statistical distribution of the sizes of the characters respectively (for instance, when the sizes of the characters are respectively located within an unevenness (a deviation) of a prescribed range.

Further, the recognized character feature obtaining module 130 may obtain the number of the recognized characters for each line outputted by the character recognizing module 125. For instance, the translation deciding module 135 may decide that the line whose number of characters is smaller than a prescribed threshold value does not need to be translated.

Further, the recognized character feature obtaining module 130 may obtain information related to the kinds of the image areas (the character image area, other image areas than the character image area or the like) to which the object line is adjacent. For instance, when the image area of the object line is enclosed by the character image areas, the translation deciding module 135 may decide that the translation is necessary.

Further, the recognized character feature obtaining module 130 may analyze the syntax of the recognized character to obtain a result of analyzing the syntax. For instance, when the result of analyzing the syntax is proper, the translation deciding module 135 may decide that the translation is necessary.

Further, the recognized character feature obtaining module 130 may extract a plurality of features of the above-described recognized character. Then, the translation deciding module 135 may decide by combining the plurality of features together. In that case, the features may be weighted.

Figure 7:
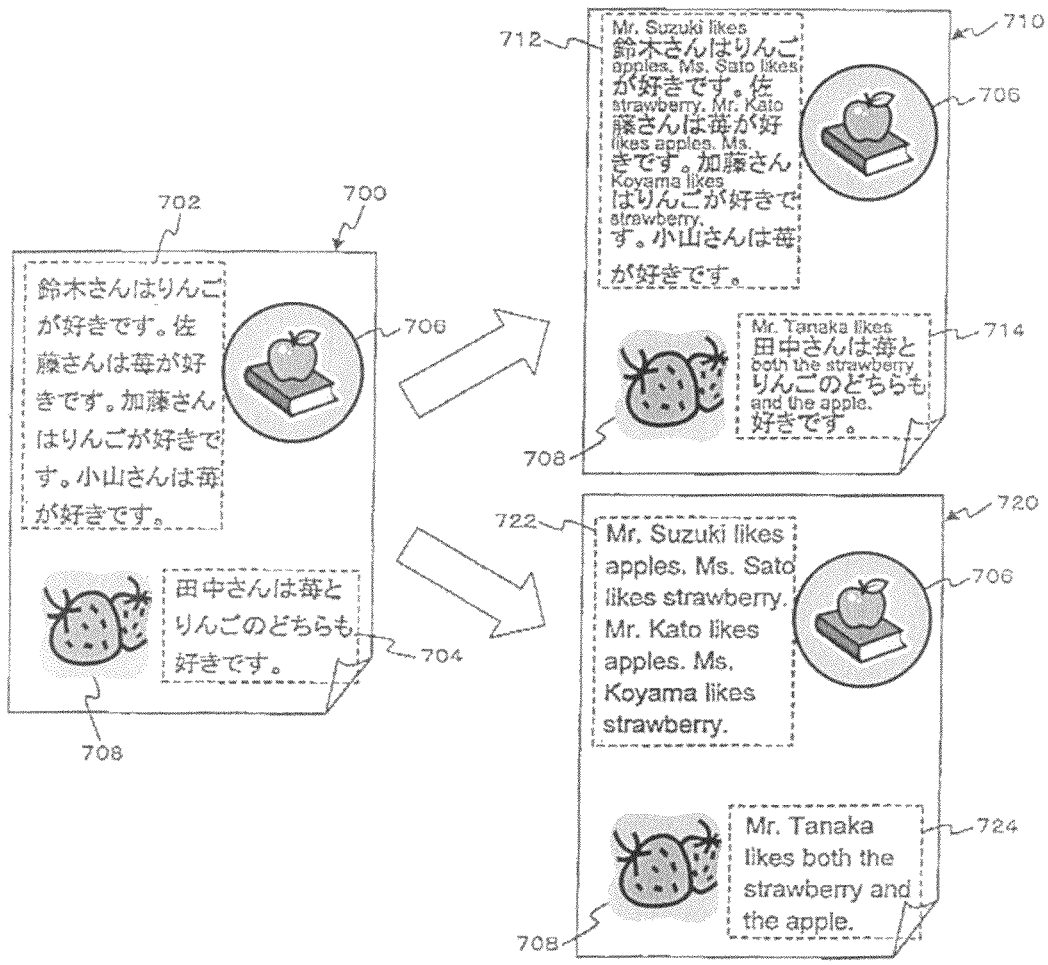
FIG. 7 is an explanatory view showing a specific process example according to the embodiment.

FIG. 7 is an explanatory view showing a specific process example according to this embodiment (especially, a process example by the output module 155).

The image receiving module 110 receives, for instance, an original copy 700. The original copy 700 includes a sentence area 702, a sentence area 704, an image area 706 and an image area 708. The sentence areas 702 and 704 serve as objects whose characters are recognized by the character recognizing module 125 and objects to be translated by the translating module 140. Further, the image areas 706 and 708 are decided not to be the character image areas by the area extracting module 115 and outputted as they are.

The output module 155 outputs the translated sentence (the translated result column 316 of the line in which the column 318 showing whether or not an output is necessary of the process table 300 shows "Y") decided to be outputted by the output deciding module 150 in accordance with an analyzed result of a structure of the original copy 700 by the area extracting module 115, the line extracting module 120 and the character recognizing module 125 (that is, the kinds (whether an area is a character area or not), the positions, the sizes of the sentence areas 702 and 704 and the image areas 706 and 708, etc.). Namely, the output module 155 uses the x coordinate column 304 to the width column 310 in the process table 300 to arrange the translated sentences in the images to be outputted. For instance, the output module 155 outputs the translated sentences like a ruby type translation output 710 and a replaced translation output 720. The ruby type translation output 710 is an example that includes sentence areas 712 and 714 and the image areas 706 and 708, outputs the image areas 706 and 708 of the original copy 700 as they are and arranges outputs the translated sentences like rubies in the sentence areas 712 and 714 (the translated sentences are arranged in the vicinity of the corresponding original). Further, the replaced translation output 720 is an example that includes a sentence area 722, a sentence area 724, an image area 706 and an image area 708, outputs the image areas 706 and 708 of the original copy 700 as they are, and arranges and outputs the translated sentences in the sentence areas 722 and 724 in place of the original.

Figure 8:
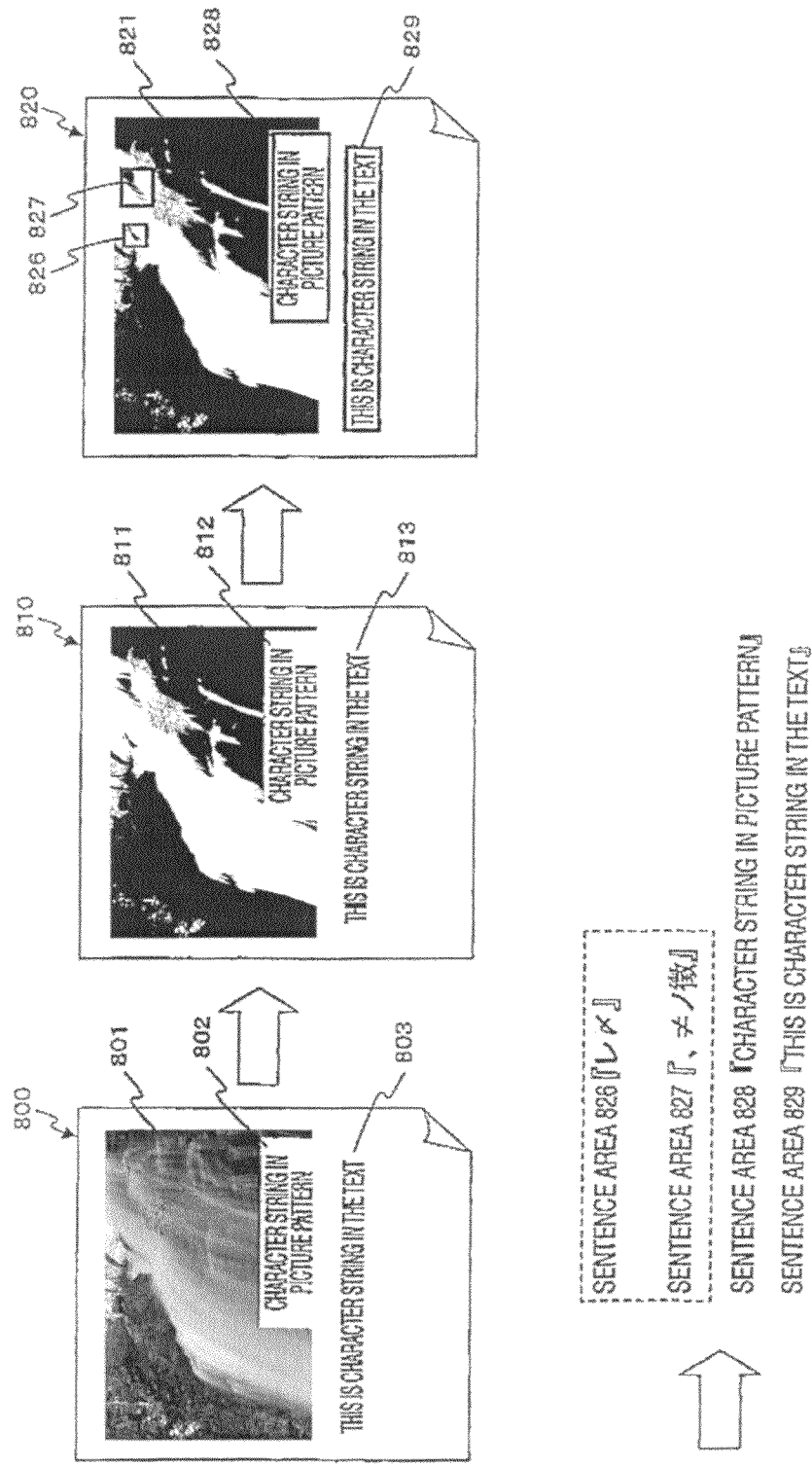
FIG. 8 is an explanatory view showing a process example by an image receiving module, an area extracting module, a line extracting module and a character recognizing module.

FIG. 8 is an explanatory view showing a process example by the image receiving module 110, the area extracting module 115, the line extracting module 120 and the character recognizing module 125.

The image receiving Module 110 receives, for instance, an original copy 800. The original copy 800 includes an image area 801, a sentence area 802 and a sentence area 803. That is, the sentence areas 802 and 803 serve as objects whose characters are to be recognized and translated. An area except the sentence area 802 in the image area 801 is to be directly outputted.

Then, the area extracting module 115 binarizes the original copy 800 to form a binary image 810. The image area 801 as a multi-valued image of the original copy 800 also becomes a binary image like an image area 811 of the binary image 810.

Further, the area extracting module 115 extracts the character image area relative to the binary image 810. Here, the area extracting module 115 extracts sentence areas 828 and 829 as the character image areas, however, extracts sentence areas 826 and 827 in an image area 821 also as the character image areas. The above-described matter arises, because when a multi-valued image such as a natural image is binarized, an area having the feature of the character image area is generated.

As a result (the sentence areas 826 to 829 are extracted as the character image areas), when a process is carried out by the line extracting module 120 and the character recognizing module 125, the sentence area 826, the sentence area 827, the sentence area 828 and the sentence area 829 is expressed as shown in FIG. 8. Here, the recognized characters of the sentence areas 826 and 827 are prevented from being objects to be translated under the process by the recognized character feature obtaining module 130 and the translation deciding module 135.

Figure 9:
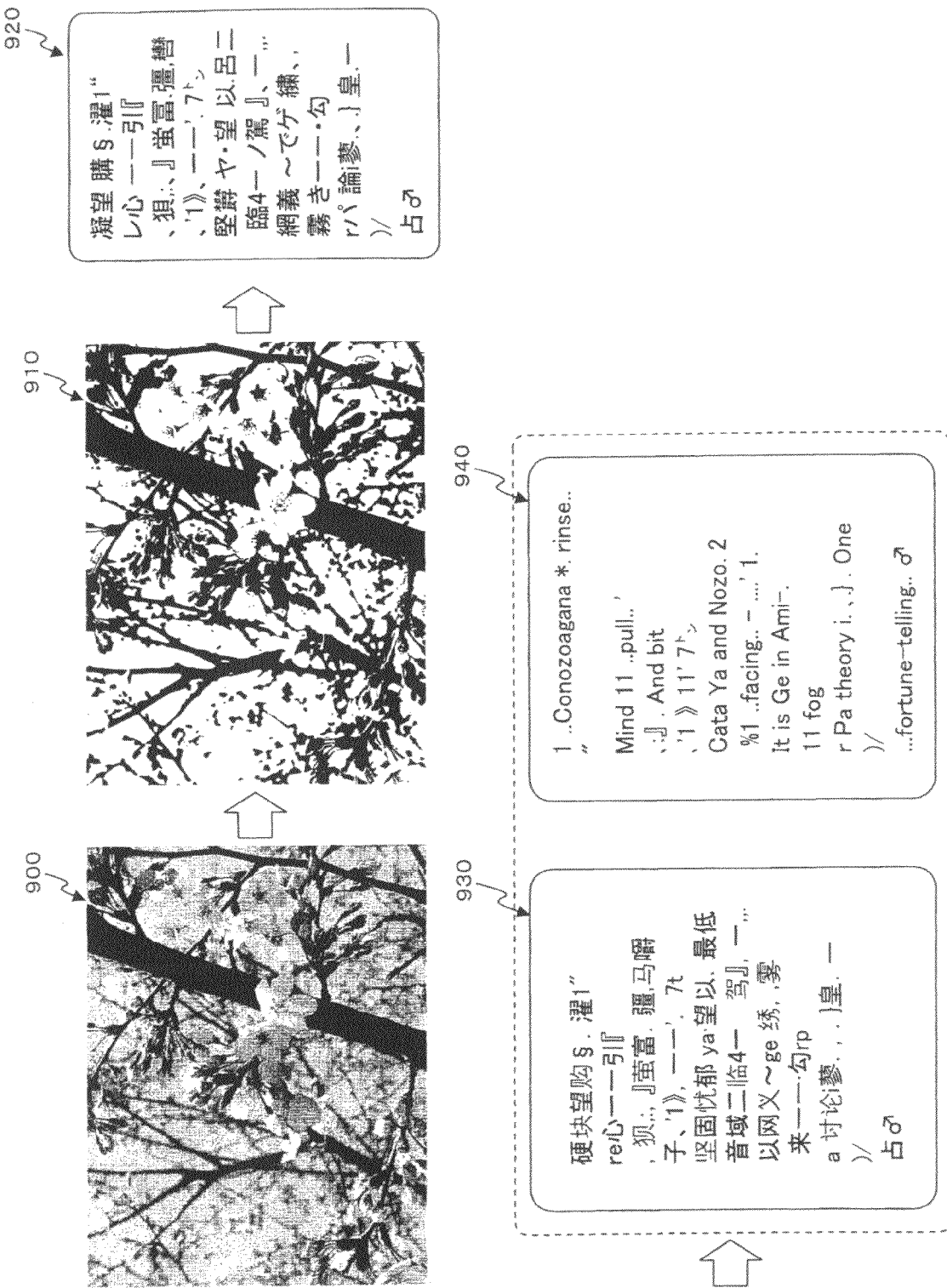
FIG. 9 is an explanatory view showing a process example by a translated sentence feature obtaining module and an output deciding module.

FIG. 9 is an explanatory view showing a process example carried out by the translated sentence feature obtaining module 145 and the output deciding module 150 (an example when the process by the recognized character feature obtaining module 130 and the translation deciding module 135 is not carried out).

The image receiving module 110 receives, for instance, an original image 900. The original image 900 does not have the character image area and is to be directly outputted.

Then, the area extracting module 115 binarizes the original image 900 to form a binary image 910. The area extracting module 115 extracts the character image area relative to the binary image 910.

When the character recognizing module 125 carries out a character recognizing process to the character image area, a Japanese character recognized result 920 as shown in FIG. 9 is obtained. Further, when the translating module 140 translates the Japanese character recognized result 920, for instance, a Chinese translation 930 and an English translation 940 as shown in FIG. 9 are obtained.

Here, the translated sentence feature obtaining module 145 and the output deciding module 150 carry out the above-described process not to output the translated sentences such as the Chinese translation 930 and the English translation 940.

Figure 10:
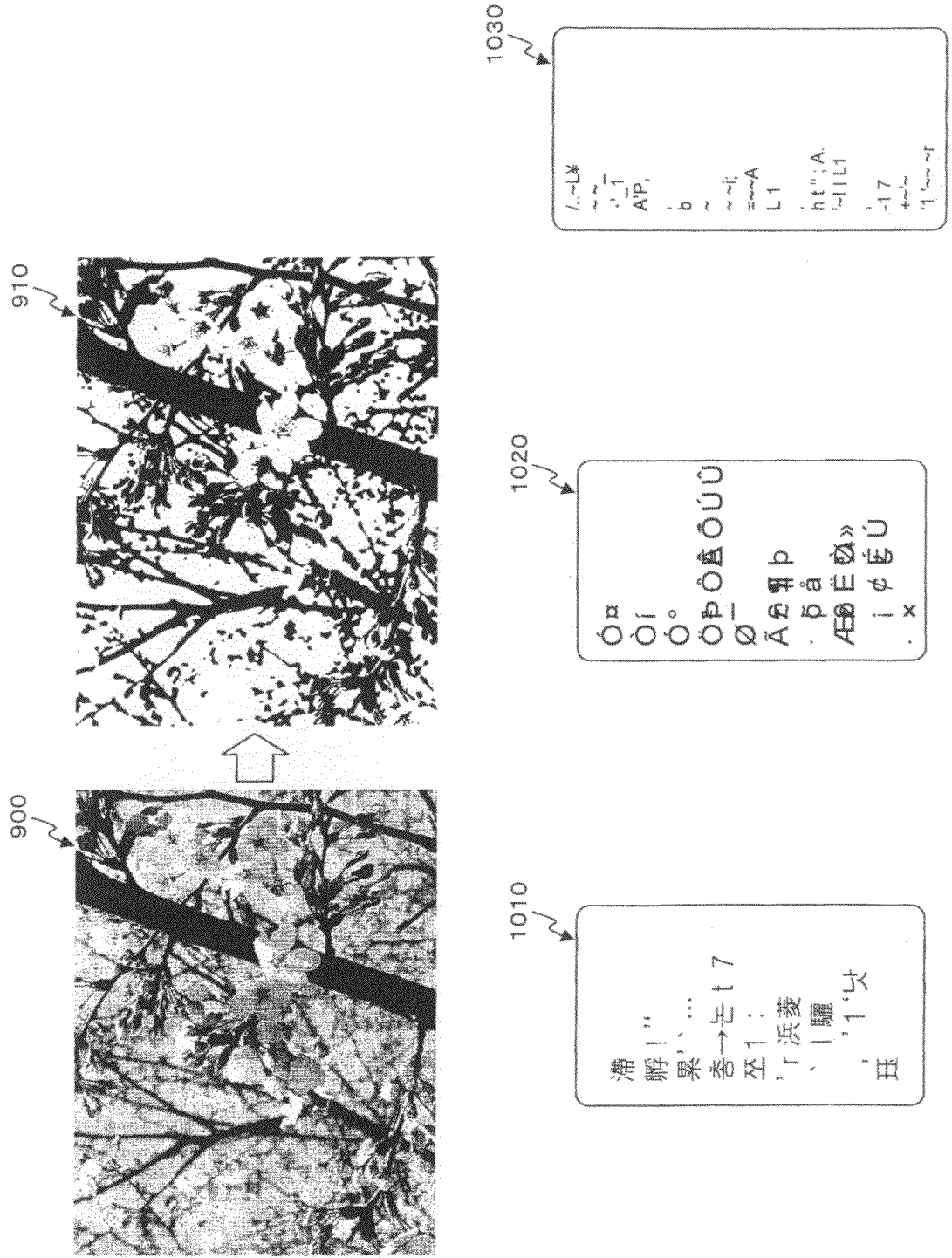
FIG. 10 is an explanatory view showing a process example by the character recognizing module for languages respectively as objects.

FIG. 10 is an explanatory view showing process examples obtained by processing languages respectively as objects by the character recognizing module 125.

A Korean character recognized result 1010, a Chinese character recognized result 1020 and an English character recognized result 1030 shown in FIG. 10 are results obtained by processing the binary image 910 by means of the character recognizing module 125 relative to Korean, Chinese and English respectively as objects. These recognized characters have the same characteristics as those of the Japanese character recognized result 920 shown in FIG. 9. Accordingly, even when the character recognizing module 125 processes other languages than Japanese, the recognized feature obtaining module 130 and the translation deciding module 135 may use the point setting table 500 and the weight setting table 600 so that the recognized character feature obtaining module 130 and the translation deciding module 135 can carry out the same process as that for Japanese as the object.

Figure 11:
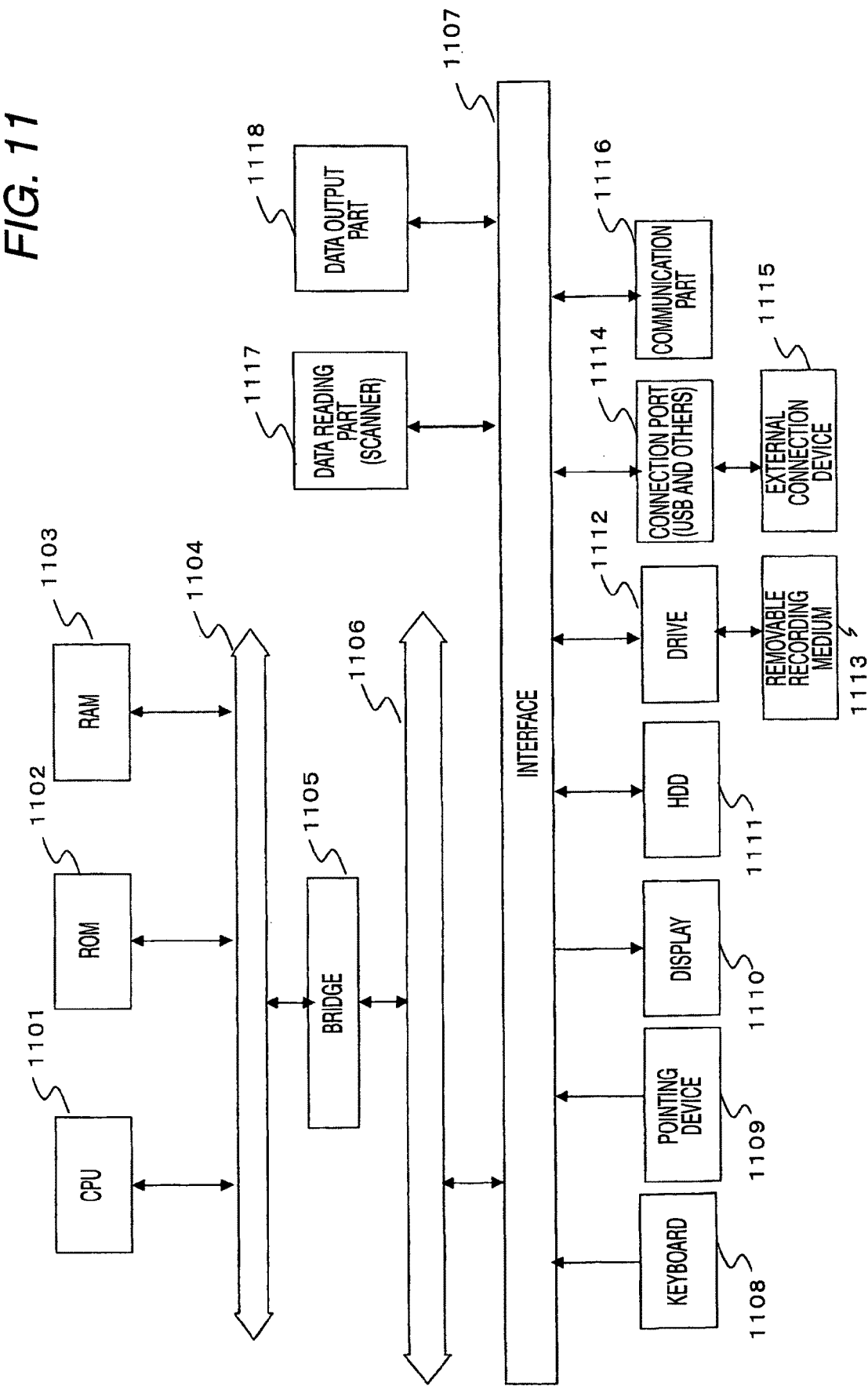
FIG. 11 is a block diagram showing a hardware structural example of a computer for realizing the embodiment.

Referring to FIG. 11, a hardware structural example of this embodiment will be described below. A structure shown in FIG. 11 is formed with, for instance, a personal computer (PC) and illustrates the hardware structural example including a data reading part 1117 such as a scanner and a data output part 1118 such as a printer.

A CPU (Central Processing Unit) 1101 is a control part for executing processes according to computer programs that respectively describe executing sequences of the various kinds of modules described in the above-described embodiment, that is, the area extracting module 115, the line extracting module 120, the character recognizing module 125, the recognized character feature obtaining module 130 or the like.

A ROM (Read Only memory) 1102 stores programs or calculating parameters or the like used by the CPU 1101. A RAM (Random Access Memory) 1103 stores programs used in the execution of the CPU 1101 or parameters suitably changing in the execution thereof. These members are mutually connected by a host bus 1104 formed with a CPU bus.

The host bus 1104 is connected to an external bus 1106 such as a PCI (Peripheral Component Interconnect/Interface) bus through a bridge 1105.

A pointing device 1109 such as a keyboard 1108, a mouse, etc. is an input device operated by an operator. A display 1110 is composed of a liquid crystal display device or a CRT (Cathode Ray Tube) or the like to display various kinds of information as a text or image information.

An HDD (Hard Disk Drive) 1111 incorporates a hard disk therein and drives the hard disk to record or reproduce the programs or information executed by the CPU 1101. In the hard disk, the received image or the recognized result by the character recognizing module 125 or the like is stored. Further, various kinds of computer programs such as other various kinds of data processing programs are stored.

A drive 1112 reads data or programs recorded in a removable recording medium 1113 such as a mounted magnetic disk, an optical disk, a photo-electro-magnetic disk or a semiconductor memory to supply the data or the programs to the RAM 1103 connected through an interface 1107, the external bus 1106, the bridge 1105 and the host bus 1104. The removable recording medium 1113 can be also used as a data recording area like the hard disk.

A connecting port 1114 is a port for connecting an external connection device 1115 and has a connecting part such as a USB, an IEEE 1394, etc. The connecting port 1114 is connected to the CPU 1101 through the interface 1107, and the external bus 1106, the bridge 1105 and the host bus 1104. A communication part 1116 is connected to a network to execute a data communication process with an external part. The data reading part 1117 is, for instance, the scanner to execute a reading process of a document. The data output part 1118 is, for instance, the printer to execute an output process of document data.

A hardware structure shown in FIG. 11 illustrates one structural example, and the embodiment of the present invention is not limited to the structure shown in FIG. 11. Any structure that can execute the modules described in the embodiment may be used. For instance, a part of the modules may be formed with an exclusive hardware (for instance, Application Specific Integrated Circuit: ASIC) or the like. A part of the modules may be located in an external system and connected by a communication line. Further, a plurality of the systems shown in FIG. 11 may be connected together by the communication line to mutually cooperate. Further, the structure shown in FIG. 11 may be incorporated in a copying machine, a facsimile device, a scanner, a printer, a compound machine (an image processor having two or more functions of the scanner, the printer, the copying machine, the facsimile device, etc.) or the like.

In the above-described embodiment, an example is shown that it is decided whether or not the recognized character is to be translated on the basis of the number of points per character in the flowchart shown in FIG. 4, however, the number of points per a plurality of characters may be used in place of the number of points per character.

The above-described program may be stored and provided in a recording medium. Further, the program may be provided by a communication unit. In this case, the above-described program may be taken as the invention of a "recording medium having a program recorded that can be read by a computer".

The "recording medium having a program recorded that can be read by a computer" means a recording medium having a program recorded that can be read by a computer, which is employed for installing and executing the program and circulating the program.

As the recording medium, are exemplified, for instance, a digital versatile disk (DVD) such as "DVD-R, DVD-RW, DVD-RAM, etc." as a standard established in a DVD forum, "DVD+R, DD+RW, etc." as a standard established by a DVD+RW, a compact disk (CD) such as a read only memory (CD-ROM), a CD recordable (CD-R), a CD rewritable (CD-RW), etc., a photo-electro-magnetic disk (MO), a flexible disk (FD), a magnetic tape, a hard disk, a read only memory (ROM), an electrically erasable and rewritable read only memory (EEPROM) a flash memory, a random access memory (RAM), etc.

The above-described program or a part thereof may be recorded and stored in the recording medium and circulated. Further, the program may be transmitted through a communication by using, for instance, a local area network (LAN), a metropolitan area network (MAN), a wide area network (WAN), a wired network or a radio communication network employed for an internet, an intranet, an extra network, and a transmitting medium such as a combination of them, or may be transmitted by a carrier wave.

Further, the above-described program may be a part of other program or stored in a recording medium together with a separate program. Further, the program may be divided and stored in a plurality of recording media. Further, the program may be recorded in any form when the program may be restored, so that the program can be compressed or encoded.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An information processor comprising:
   at least one processor; and
   at least one memory, the at least one memory storing instructions that when executed cause the at least one processor to function as:
   a specifying unit that specifies a candidate region in an image;
   a character recognizing unit that recognizes characters in the candidate region;
   a recognized character feature obtaining unit that obtains, as a recognized character feature, a quantity of predetermined characters contained in the characters recognized by the character recognizing unit;
   a translation deciding unit that decides whether or not the recognized characters are to be translated in accordance with the recognized character feature obtained by the recognized character feature obtaining unit,
   a translation unit that translates the recognized characters in accordance with a decision from the translation deciding unit;
   an outputting deciding unit that decides whether to output the translated result in accordance with a feature obtained from a translated result; and an outputting unit that outputs the translated result in accordance with the decision from the outputting deciding unit, wherein the predetermined characters are characters frequently appearing in characters obtained by performing character recognition in a region which does not include characters.

2. The information processor as claimed in claim 1, wherein the recognized character feature obtaining unit, in a case where a picture image other than the characters is recognized, obtains a fourth feature related to an arrangement of a character area included in the picture image.

3. The information processor as claimed in claim 1, wherein the recognized character feature obtaining unit obtains a fifth feature related to a predetermined number of letters of a character area included in the image.

4. The information processor as claimed in claim 2, wherein the recognized character feature obtaining unit obtains a fifth feature related to a predetermined number of letters of a character area included in the image.

5. A processor implemented information processing method comprising:

receiving an image including a non-character region;
specifying a candidate region in the image;
recognizing characters in the candidate region;
obtaining as a recognized character feature, a quantity of predetermined characters contained in the characters recognized in the candidate region;
deciding whether or not the recognized characters are to be translated in accordance with the obtained recognized character feature;
translating, via the processor, the recognized characters in a case where it is decided that the recognized characters are to be translated;
obtaining a feature from a translated result;
deciding whether or not the translated result is to be outputted in accordance with the feature obtained from the translated result; and
outputting, in a case where the output deciding unit decides that the translated result is to be outputted, the translated result in accordance with a structure of the image,
wherein
the recognizing of the characters recognizes characters in the character image of the received image in the receiving of the image,
the obtaining of the recognized character feature of the recognized characters, in a case where a picture image other than the characters are recognized, obtains a feature related to characters included in the picture image, and
wherein the predetermined characters are characters frequently appearing in characters obtained by performing character recognition in a region which does not include characters.

6. A non-transitory computer readable medium storing a program causing a computer to execute a process for performing an information processing, the process comprising:

receiving an image including a non-character region;
specifying a candidate region in the image;
recognizing characters in the candidate region;
obtaining as a recognized character feature, a quantity of predetermined characters contained in the characters recognized in the candidate region;
deciding whether or not the recognized characters are to be translated in accordance with the obtained recognized character feature;
translating the recognized characters in a case where it is decided that the recognized characters are to be translated;
obtaining a feature from a translated result;
deciding whether or not the translated result is to be outputted in accordance with the feature obtained from the translated result; and
outputting, in a case where the output deciding unit decides that the translated result is to be outputted, the translated result in accordance with a structure of the image,
wherein
the recognizing of the characters recognizes characters in the character image of the received image in the receiving of the image,
the obtaining of the recognized character feature of the recognized characters, in a case where a picture image other than the characters are recognized, obtains a feature related to characters included in the picture image, and
the predetermined characters are characters frequently appearing in characters obtained by performing character recognition in a region which does not include characters.

7. The information processor as claimed in claim 1, the at least one memory storing further instructions that when executed cause the at least one processor to further function as:

a translating unit that translates the recognized characters in a case where it is decided that the recognized characters are to be translated by the translation deciding unit;
a translated result feature obtaining unit that obtains a second feature from a translated result obtained by the translating unit; and
an output deciding unit that decides whether or not the translated result obtained by translating unit is to be outputted in accordance with the second feature obtained by the translated result feature obtaining unit.

8. The information processor as claimed in claim 7, the at least one memory further storing instruction which cause the at least one processor to further function as:

an image receiving unit that receives an image; and
an output unit that, in a case where the output deciding unit decides that the translated result is to be outputted, outputs the translated result in accordance with a structure of the image received by the image receiving unit,
wherein
the character recognizing unit recognizes characters in the character image of the image received by the image receiving unit.

9. The information processor as claimed in claim 8, wherein the recognized character feature obtaining unit, in a case where a picture image other than the characters is recognized, obtains a third feature related to a character area included in the picture image.

10. The information processor as claimed in claim 1, wherein the predetermined characters correspond to non-character image features appearing similar to recognized characters.

11. The processor implemented information processing method as claimed in claim 5, wherein the predetermined characters correspond to non-character image features appearing similar to recognized characters.

12. The non-transitory computer readable medium as claimed in claim 6, wherein the predetermined characters correspond to non-character image features appearing similar to recognized characters.

* * * * *